US011675092B2

(12) United States Patent
Adachi

(10) Patent No.: US 11,675,092 B2
(45) Date of Patent: Jun. 13, 2023

(54) ACCURACY OF GLOBAL NAVIGATION SATELLITE SYSTEM BASED POSITIONING USING HIGH DEFINITION MAP BASED LOCALIZATION

(71) Applicant: NVIDIA CORPORATION, Santa Clara, CA (US)

(72) Inventor: Jeffrey Minoru Adachi, El Cerrito, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 87 days.

(21) Appl. No.: 17/183,031

(22) Filed: Feb. 23, 2021

(65) Prior Publication Data

US 2021/0255337 A1   Aug. 19, 2021

Related U.S. Application Data

(63) Continuation of application No. 16/735,621, filed on Jan. 6, 2020, now Pat. No. 10,928,523, which is a
(Continued)

(51) Int. Cl.
*G01S 19/44* (2010.01)
*G01S 19/45* (2010.01)
(Continued)

(52) U.S. Cl.
CPC .......... *G01S 19/44* (2013.01); *G01C 21/1652* (2020.08); *G01C 21/1656* (2020.08);
(Continued)

(58) Field of Classification Search
CPC .......... G01S 19/44; G01S 19/45; G01S 19/46; G01S 19/47; G01C 21/165; G01C 21/30; G01C 21/36
(Continued)

(56) References Cited

U.S. PATENT DOCUMENTS 9,489,575 B1 * 11/2016 Whalen .................. G01C 23/00
2014/0292570 A1   10/2014 Wallace et al.
(Continued)

FOREIGN PATENT DOCUMENTS

| CN | 106960591 A | * | 7/2017 | ......... G06K 9/00791 |
| JP | 2004198377 A | * | 7/2004 | |

(Continued)

OTHER PUBLICATIONS

PCT International Search Report and Written Opinion, PCT Application No. PCT/US2018/062275, dated Feb. 5, 2019, 12 pages.

*Primary Examiner* — Harry K Liu
(74) *Attorney, Agent, or Firm* — Maschoff Brennan

(57) ABSTRACT

A vehicle, for example, an autonomous vehicle receives signals from a global navigation satellite system (GNSS) and determines accurate location of the vehicle using the GNSS signal. The vehicle performs localization to determine the location of the vehicle as it drives. The autonomous vehicle uses sensor data and a high definition map to determine an accurate location of the autonomous vehicle. The autonomous vehicle uses accurate location of the vehicle to determine RTK corrections that is used for improving GNSS location estimates at a future location. The RTK corrections may be transmitted to other vehicles.

20 Claims, 12 Drawing Sheets

Related U.S. Application Data continuation of application No. 16/198,324, filed on Nov. 21, 2018, now Pat. No. 10,527,734.

(60) Provisional application No. 62/589,873, filed on Nov. 22, 2017.

(51) Int. Cl.
| | |
|---|---|
| *G01C 21/30* | (2006.01) |
| *G01C 21/36* | (2006.01) |
| *G01S 19/48* | (2010.01) |
| *G01S 19/49* | (2010.01) |
| *G01C 21/16* | (2006.01) |

(52) U.S. Cl.
CPC ............ *G01C 21/30* (2013.01); *G01C 21/36* (2013.01); *G01S 19/45* (2013.01); *G01S 19/485* (2020.05); *G01S 19/49* (2013.01)

(58) Field of Classification Search
USPC ..................................................... 342/357.27
See application file for complete search history.

(56) References Cited

U.S. PATENT DOCUMENTS

| | | |
|---|---|---|
| 2014/0324291 A1 | 10/2014 | Jones et al. |
| 2014/0375497 A1 | 12/2014 | Friend et al. |
| 2015/0153456 A1 | 6/2015 | Feller et al. |
| 2016/0036519 A1 | 2/2016 | Loomis et al. |
| 2016/0178754 A1 | 6/2016 | Ashjaee |
| 2016/0313450 A1 | 10/2016 | Jordan et al. |
| 2017/0176991 A1* | 6/2017 | Hoskeri ............. B60W 50/082 |
| 2017/0241787 A1 | 8/2017 | Trigoni et al. |
| 2018/0239030 A1 | 8/2018 | Chen et al. |
| 2019/0012909 A1 | 1/2019 | Mintz |
| 2020/0234582 A1 | 7/2020 | Mintz |

FOREIGN PATENT DOCUMENTS

| | | | |
|---|---|---|---|
| JP | 2007182198 A * | 7/2007 | |
| WO | 2017120595 B2 | 7/2017 | |
| WO | WO-2017115342 A1 * | 7/2017 | ......... G06Q 30/0206 |
| WO | 2017160465 B1 | 9/2017 | |

* cited by examiner

ACCURACY OF GLOBAL NAVIGATION SATELLITE SYSTEM BASED POSITIONING USING HIGH DEFINITION MAP BASED LOCALIZATION

CROSS REFERENCE TO RELATED APPLICATIONS

This application is a continuation of U.S. patent application Ser. No. 16/735,621, filed on Jan. 6, 2020, which is a continuation of U.S. patent application Ser. No. 16/198,324, filed on Nov. 21, 2018, which claims the benefit of priority under 35 USC 119(e) to U.S. Provisional Application No. 62/589,873 filed on Nov. 22, 2017, the disclosures of each of which are hereby incorporated herein by this reference in their entireties.

BACKGROUND

This disclosure relates generally to determining location of a vehicle (e.g., autonomous vehicle) based on global navigation satellite systems (for example, GPS) and more particularly to determining location of the vehicle based on global navigation satellite systems using localization performed using high definition maps.

Autonomous vehicles, also known as self-driving cars, driverless cars, auto, or robotic cars, drive from a source location to a destination location without requiring a human driver to control and navigate the vehicle. Autonomous vehicles need to determine their location accurately to be able to navigate. Autonomous vehicles often determine their location using global navigation satellite systems (GNSS). Examples of GNSS include the United States' Global Positioning System (GPS), Russia's GLONASS, China's BeiDou Navigation Satellite System (BDS), and European Union's Galileo system. GNSS based positioning uses satellite signals to determine position of a vehicle. A GNSS receiver receives signals from satellites and determines the location of the receiver, for example, longitude, latitude, and altitude/elevation based on the signals. Global navigation satellite systems (GNSS), provide accuracies of approximately 3-5 meters which is low for a high definition map.

There are several sources of error in GNSS position estimates. GNSS positions are based on estimating range to satellites in known positions and range is modeled as a satellite signal's time of flight multiplied by signal speed. So errors in satellite positions, clocks, and signal speed lead to errors in position. Satellite orbits vary due to changes in solar radiation pressure. Satellite atomic clocks drift due to relativistic effects. Several factors affect the speed of the satellite signal propagation. The speed of light varies with the medium. For example, it is slower in the air near the ground than in the vacuum of space, so the average speed of the signal depends on the amount of atmosphere it passes through between the satellite and the receiver. Ionization of the ionosphere slows and deflects the signals. All these errors result in loss of accuracy of a GNSS signal, making it challenging to accurately determine the location of the vehicle.

GNSS based positioning can be improved using techniques such as real-time kinematic (RTK) positioning. RTK enhancement uses a receiver at a known location (base station) to estimate the errors for each satellite. These error estimates can be used to correct the range estimates at a nearby moving receiver (rover). Use of RTK has several disadvantages. RTK requires multiple receivers, one stationary receiver and one roving receiver. That increases the cost of maintaining an RTK based system. Furthermore, the accuracy provided by an RTK based system is limited by distance between receivers. Also, coverage for RTK based systems from commercial service providers is limited geographically. Accordingly, if a vehicle was driving in an area that did not provide coverage, the vehicle would not be able to perform the RTK based correction. If a vehicle was driving in an area that had RTK coverage and drove outside the coverage area, the vehicle would experience a sudden loss of accuracy due to loss of RTK signal. Another weakness of RTK enhancement is that a data link (radio or phone network) must be maintained to transmit the correction data from the base station to the rover. This data link adds complication and cost to an RTK system. If the communication link is lost, the performance of the system degrades. Vehicles such as autonomous vehicles that need highly accurate and reliable position determination to be able to navigate are not able to rely on current RTK solutions.

Other techniques for improving GNSS based positioning include Satellite Based Augmentation Systems (SBAS). An SBAS based system provides correction that provide coverage for large areas. However the accuracy provided by such systems is less than an RTK based techniques. Furthermore, these techniques also require an antenna to receive correction data and a subscription fee charged by a provider for the service due to the cost of the infrastructure used to provide the signal.

Therefore, conventional techniques for using GNSS based positioning do not provide sufficient accuracy and RTK based correction has various drawbacks that make such systems inadequate for purposes that require high accuracy, for example, autonomous driving. One approach to using GNSS positioning for localizing an autonomous car is to use low grade GNSS position estimate as a starting guess that is refined by aligning data from other sensors, such as LiDAR and cameras, to a map to get a more accurate pose estimate. Typical refinement techniques are sensitive to the quality of the initial guess. If the starting point is too far from the true solution, alignment may be slow and the algorithms can even get stuck at a local optimum. This results in waste of computing resources. So for speed and reliability, it is desirable to enhance the GNSS estimate. Current RTK approaches have adequate accuracy, when they work, but have disadvantages in complication, cost, coverage and reliability. SBAS systems have good coverage, but limited accuracy.

SUMMARY

An autonomous vehicle periodically performs localization to determine accurate location of the vehicle as the autonomous vehicle drives. RTK corrections are determined based on location of the vehicle determined using localization and raw GNSS signal received at the time of localization. The RTK corrections are used by the vehicle for improving GNSS position estimates in future, for example, within the next few seconds. The following steps may be performed by a computing system of the autonomous vehicle, also referred to as the system.

The system initializes by determining GNSS position estimates based on raw GNSS signal received at the time of a localization to a map. The system uses the localization result and the GNSS position estimates to calculate RTK corrections. The system repeats the following steps as the autonomous vehicle drives. The system receives a raw GNSS signal from a GNSS receiver mounted on the autonomous vehicle. The system accesses the RTK corrections previously determined by the autonomous vehicle. The system determines an accurate GNSS position estimate by applying the previously determined RTK corrections to the raw GNSS signal.

In an embodiment, the enhanced GNSS position estimates are used to fill in missing localization results when the localization process fails, possibly due to a scene with insufficient alignment features.

In an embodiment, the enhanced GNSS position estimates are used to initialize the localization algorithms. The system receives sensor data captured by sensors mounted on the autonomous vehicle, for example lidar scans captured by a lidar mounted on the autonomous vehicle or images captured by cameras mounted on the autonomous vehicle. The system determines a current location of the autonomous vehicle in a high definition map using the accurate GNSS position estimate as a starting point. The system combines the localization result and the raw GNSS signal to determine new RTK corrections for use at a location reached by the autonomous vehicle in future, for example, in the subsequent iteration of the steps of the method.

In an embodiment, the enhanced GNSS position estimates are fused with other sensor data, like inertial measurements unit data or visual odometry data, to create a new position estimate that is used to initialize the localization algorithms.

In an embodiment, the system initializes the location of the autonomous vehicle by performing the following steps. The system receives raw GNSS signal. The system receives sensor data captured by sensors mounted on the autonomous vehicle. The system accesses a portion of high definition map describing a geographical region surrounding the current location of the autonomous vehicle. The system determines the location of the vehicle based on the high definition (HD) map, the sensor data and a location of the vehicle determined using the raw GNSS signal.

In an embodiment, the system determines location of the autonomous vehicle by determining a point cloud based on sensor data, for example, lidar data. The system determines a point cloud of a geographical region surrounding the autonomous vehicle based on the HD map data. The system aligns the two point clouds to determine the location of the vehicle.

In an embodiment, the system determines location of the autonomous vehicle by determining one or more features describing the surrounding of the autonomous vehicle based on the sensor data and matching the features with features in the HD map data.

In an embodiment, the system broadcasts the RTK corrections for use by other vehicles, for example, vehicles driving in the vicinity of the autonomous vehicle, thereby allowing them to enhance accuracy of their GNSS location estimates.

Although embodiments are described in connection with autonomous vehicles, the techniques described herein can be used by other types of vehicles, for example, vehicles that are driven by human drivers. Furthermore, embodiments of the invention may be used for other types of navigable machines, for example, robots, ships, drones, airplanes, and the like.

BRIEF DESCRIPTION OF THE DRAWINGS

Figure (FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Embodiments generate and maintain high definition (HD) maps that are accurate and include the most updated road conditions for safe navigation.

Figure 1:
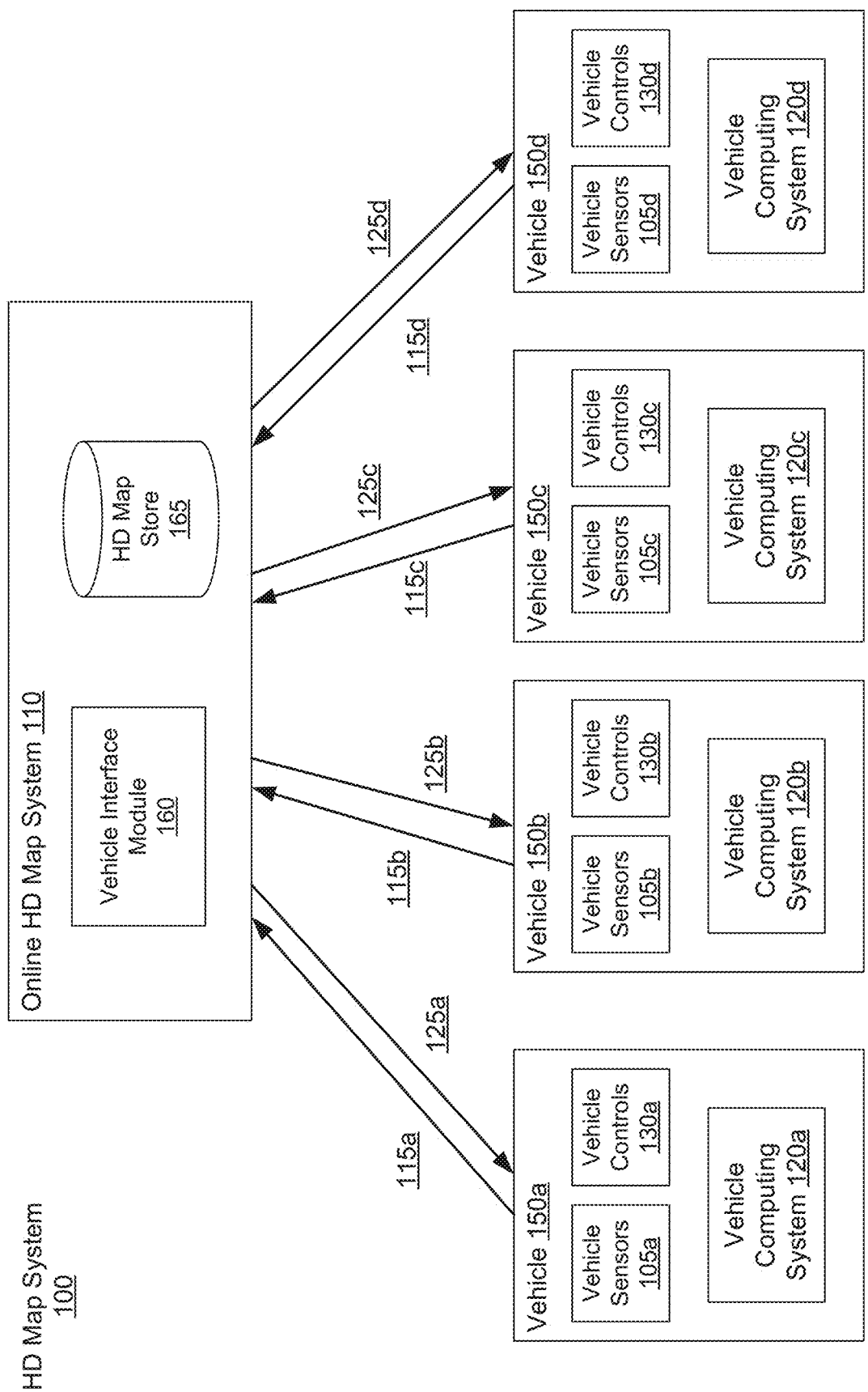

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
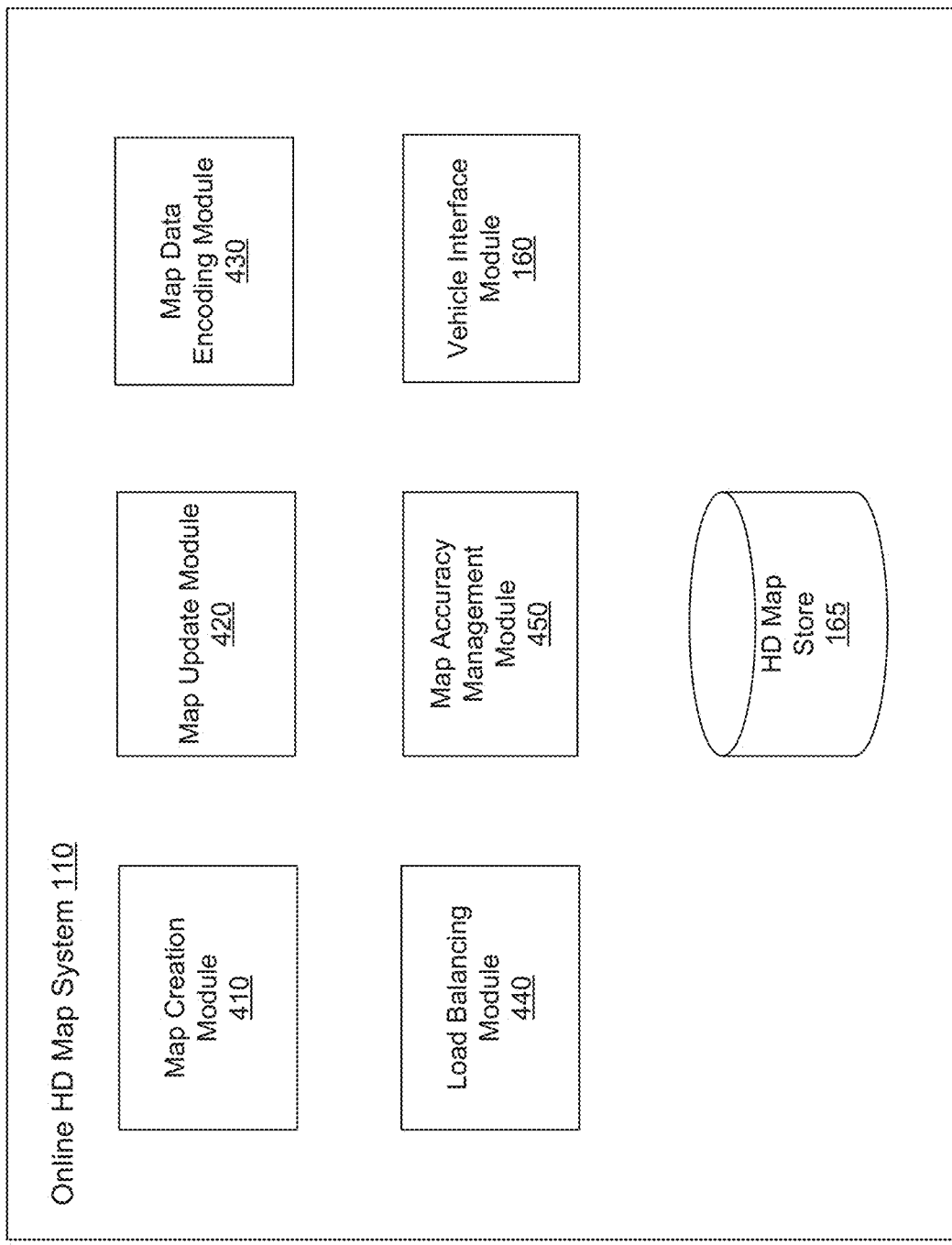
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the location of the vehicle based on signals from satellites. The position of the vehicle may also be referred to as the location of the vehicle. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
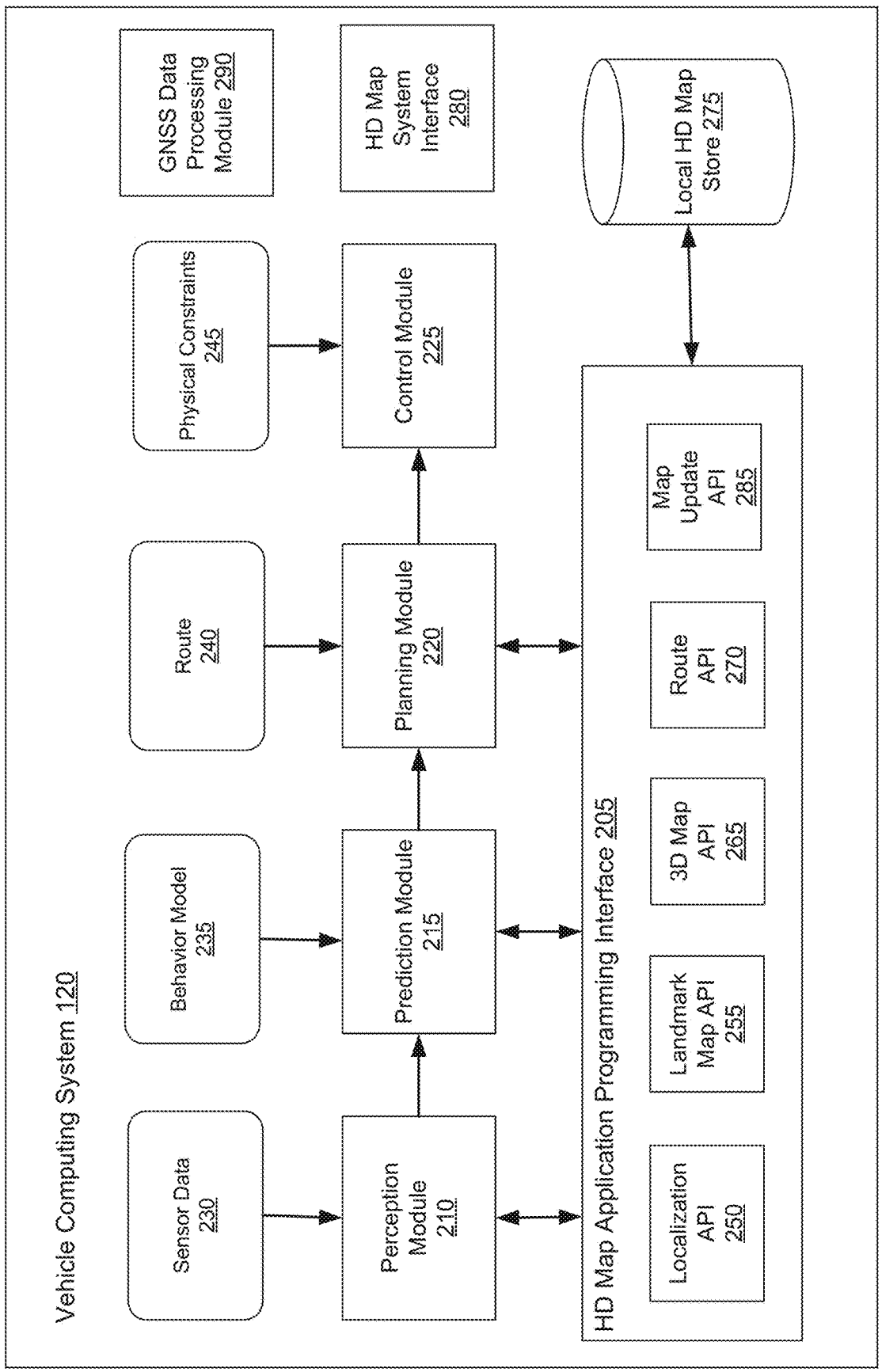
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a GNSS data processing module 290, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

The GNSS data processing module 290 processes GNSS data to improve the accuracy of position determined based on the GNSS signal. Details of the GNSS data processing module 290 are further described herein.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
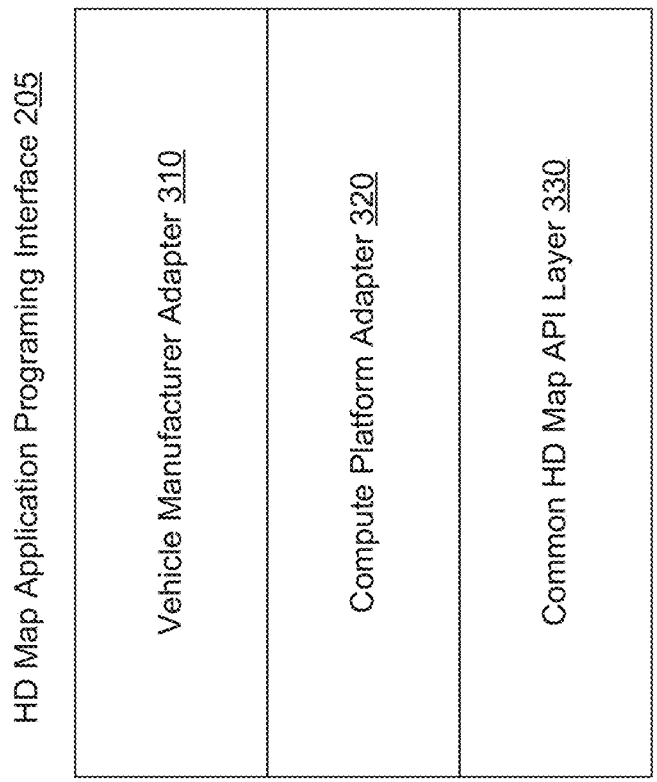
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
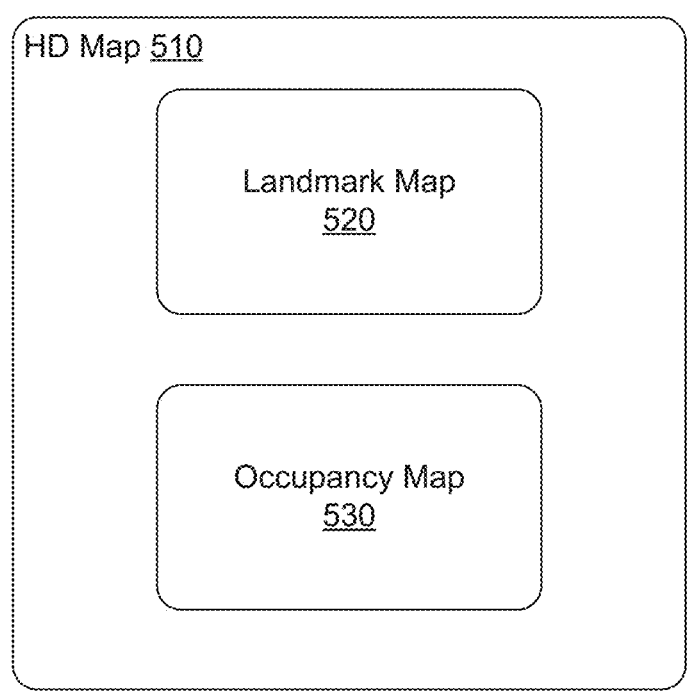
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
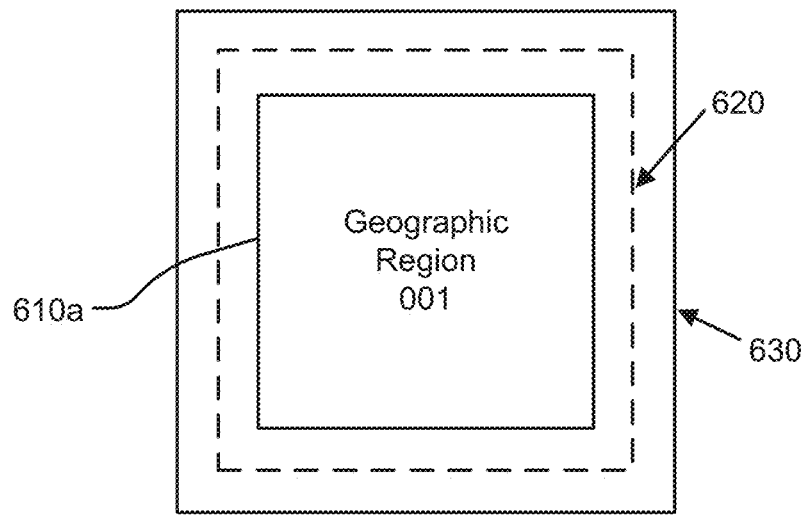
FIGS. 6A-B illustrate geographical regions defined in an HD map, according to an embodiment.
Figure 6B:
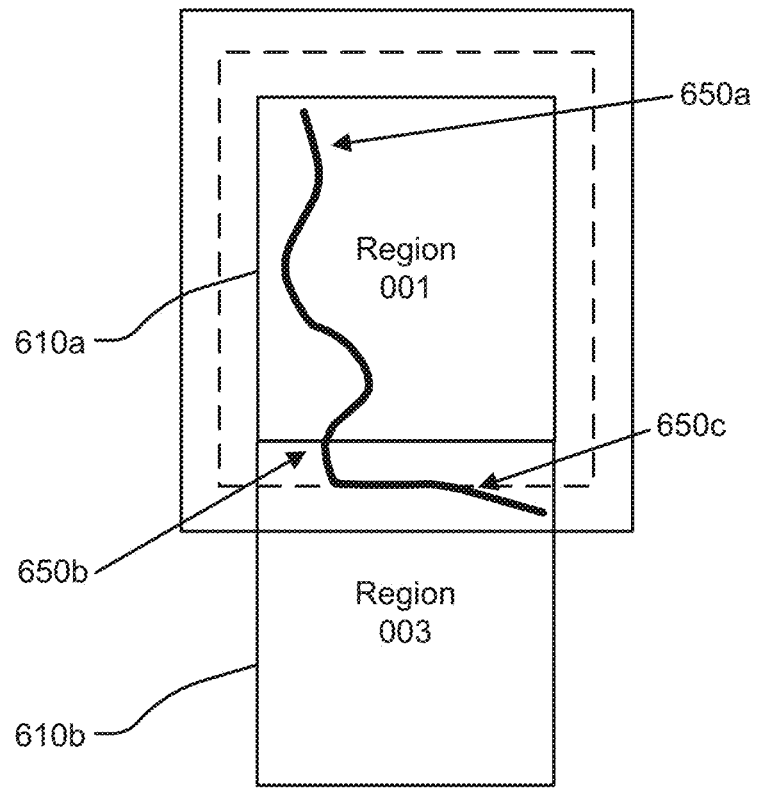

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610*a* and a boundary 630 for buffer of 100 meters around the geographic region 610*a*. The vehicle computing system 120 switches the current geographical region of a vehicle from one geographical region to the neighboring geographical region when the vehicle crosses a threshold distance within this buffer. For example, as shown in FIG. 6B, a vehicle starts at location 650*a* in the geographical region 610*a*. The vehicle traverses along a route to reach a location 650*b* where it cross the boundary of the geographical region 610 but stays within the boundary 620 of the buffer. Accordingly, the vehicle computing system 120 continues to use the geographical region 610*a* as the current geographical region of the vehicle. Once the vehicle crosses the boundary 620 of the buffer at location 650*c*, the vehicle computing system 120 switches the current geographical region of the vehicle to geographical region 610*b* from 610*a*. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
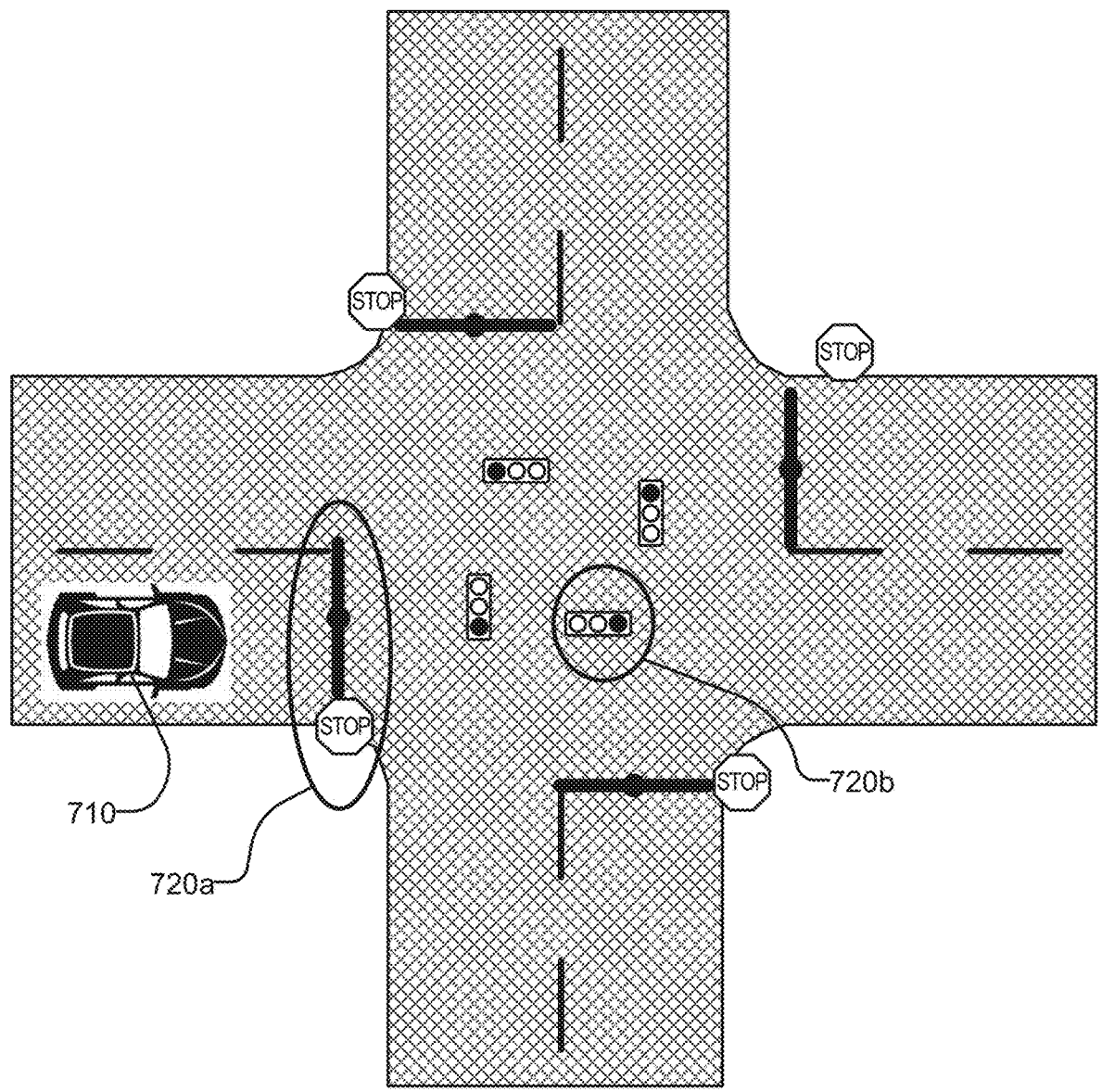
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720*a* and 720*b* that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
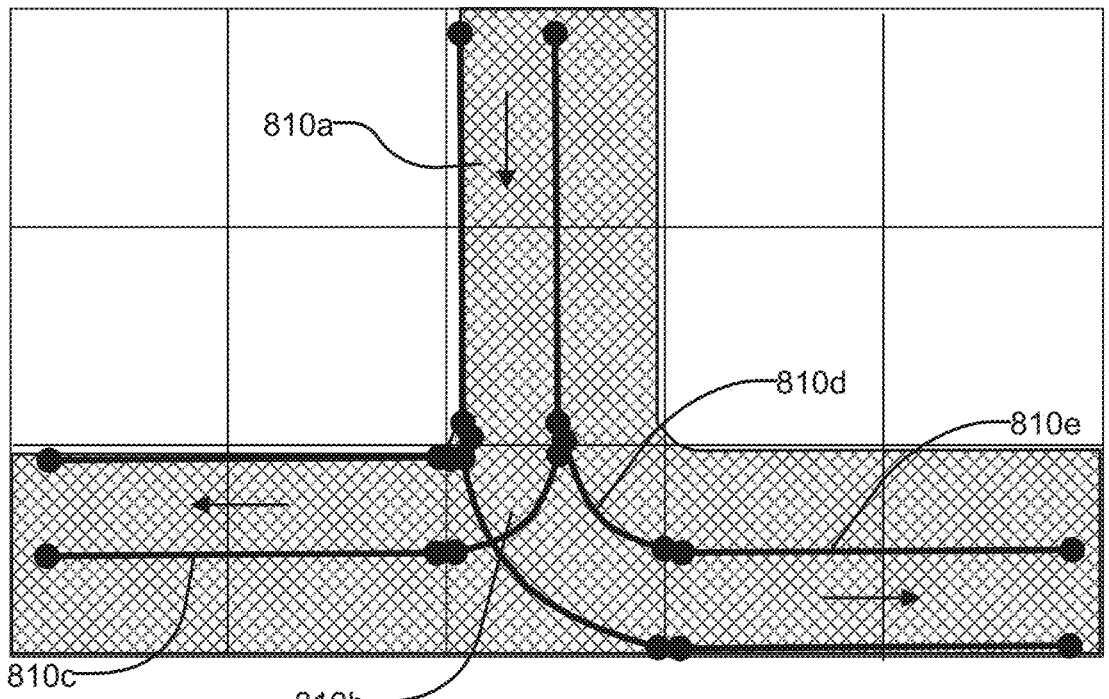
FIGS. 8A-B illustrates lane elements and relations between lane elements in an HD map, according to an embodiment.
Figure 8B:
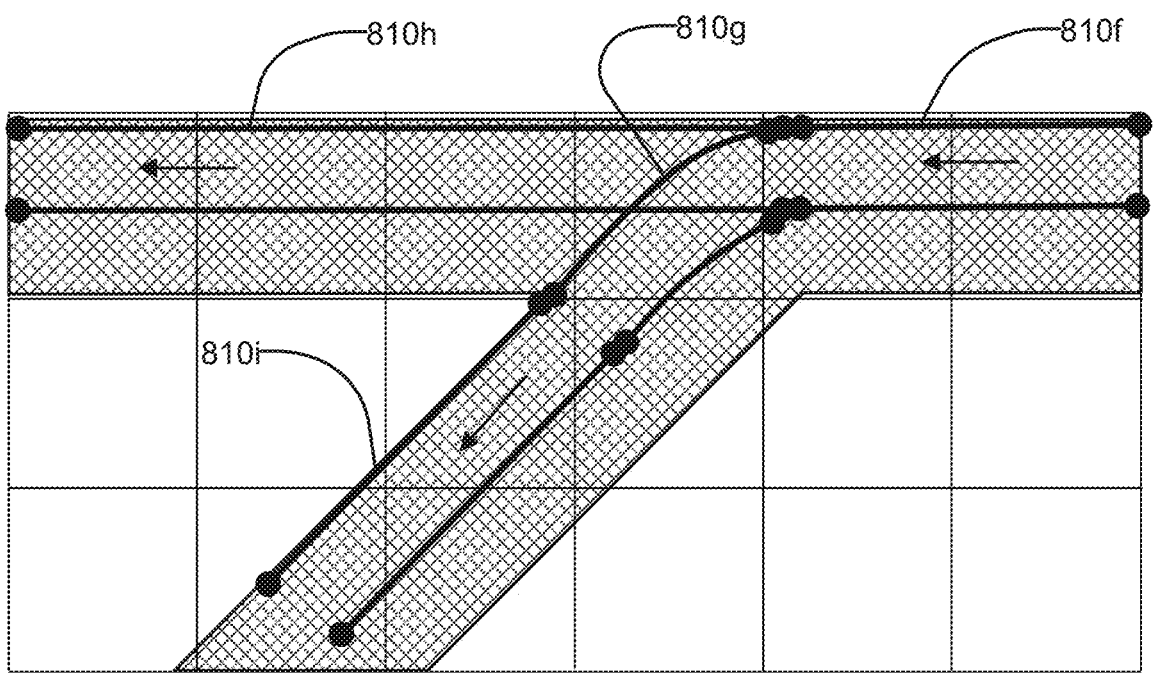

FIGS. 8A-B illustrates lane elements and relations between lane elements in an HD map, according to an embodiment. FIG. 8A shows an example of a T junction in a road illustrating a lane element 810*a* that is connected to lane element 810*c* via a turn lane 810*b* and is connected to lane 810*e* via a turn lane 810*d*. FIG. 8B shows an example of a Y junction in a road showing label 810*f* connected to lane 810*h* directly and connected to lane 810*i* via lane 810*g*. The HD map system 100 determines a route from a source location to a destination location as a sequence of connected lane elements that can be traversed to reach from the source location to the destination location.

GNSS Data Processing Module

Figure 9:
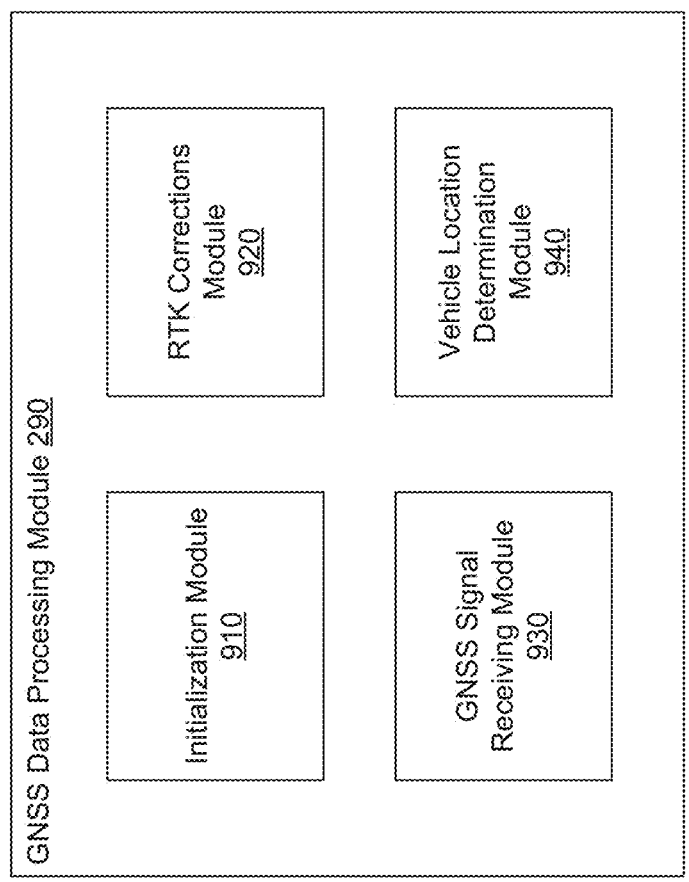
FIG. 9 describes the system architecture of a GNSS data processing module according to an embodiment.

FIG. 9 describes the system architecture of a GNSS data processing module according to an embodiment. The GNSS data processing module 290 determines accurate location of the autonomous vehicle using GNSS signals received by the autonomous vehicle. The GNSS data processing module 290 includes an initialization module 910, a RTK corrections module 920, a GNSS signal receiving module 930, and a vehicle location determination module 940.

The initialization module 910 initializes various values, for example, when a vehicle starts from a stopped condition where the vehicle may have been positioned for a long time. The initialization module 910 initializes values including the vehicle location and RTK Corrections.

The GNSS signal receiving module 930 receives the raw GNSS signal broadcast by GNSS satellites. The raw GNSS signal received by the GNSS signal receiving module 930 is processed by the GNS data processing module 290. The GNSS signal receiving module 930 comprises a receiver device that is capable of receiving signals from GNSS satellites. The GNSS signal receiving module 930 calculates the vehicle's location (or geographical position) based on the raw GNSS signal. Raw GNSS signal refers to the signal received from the GNSS satellites without any enhancement performed by the autonomous vehicle. The GNSS signal receiving module 930 may determine GNSS measurements based on the GNSS signals, for example, pseudorange, phase and doppler shift estimates. The raw GNSS signals may include ranging signals and navigation messages. The ranging signals are used to measure the distance to the satellite. The navigation messages include information comprising date and time; a satellite's status and an indication of its health, orbital information which allows the receiver to calculate the position of the satellite; and information and status concerning other satellites, referred to as almanac or ephemeris data.

The RTK correction module 920 determines RTK corrections based on an accurate location of the vehicle that may be determined based on sensor data and the raw GNSS signals. RTK corrections may also be referred to herein as GNSS corrections. In an embodiment, the RTK corrections module 920 determines RTK corrections using carrier-phase differential, where the carrier phase is the phase of the received carrier with respect to the phase of a carrier generated by an oscillator in the GNSS receiving module 930. The RTK corrections module 920 may use the satellite signal's carrier wave as its signal. In these embodiments, the range to a satellite may be determined by multiplying the carrier wavelength times the number of cycles between the satellite and the GNSS receiver and adding the phase difference. The RTK corrections may be represented using a standard format or a proprietary format corresponding to real-time data correction protocols such as Compact Measurement Record (CMR) protocol or Radio Technical Commission for Maritime Services (RTCM) protocol. Although the above description refers to specific embodiments of RTK corrections, the techniques disclosed apply to any RTK augmentation technique.

In an embodiment, the RTK corrections module 920 uses an RTK based system to determine the RTK corrections and to determine accurate GNSS position estimates from raw GNSS data based on the RTK corrections. For example, the RTK corrections module 920 may use an existing implementation on RTK enabled chip (for example, U-BLOX M8P) and provides RTK corrections over USB or RS232, as if the RTK corrections were received from a base station over radio. The RTK corrections may be considered valid for a threshold time, for example, for one or more seconds. If the vehicle performs localization at the rate of 10-20 Hz, one second time allows the vehicle to perform corrections for 10-20 frames. In an embodiment, the RTK corrections module 920 also determines a measure of confidence or an estimate of error in the location estimated using the GNSS.

In contrast with an RTK based system, the autonomous vehicle does not need to broadcast the RTK corrections to be able to correct the GNSS data at a future time point since the autonomous vehicle acts as the base station as well as the rover station of an RTK network. This is so because the previous location of the autonomous vehicle acts as the known location of a base station in an RTK network and the current location of the autonomous vehicle acts as the location of the rover station in the RTK network.

In some embodiments, the autonomous vehicle may broadcast the RTK corrections for other vehicles or GNSS receivers to use. This allows the RTK corrections to be provided in regions where correction signals are unreliable or the fixed base stations are too far away to be accurate. The GNS data processing module 290 determines an accurate GNSS position estimate from the raw GNSS signal by combining RTK corrections determined by the RTK corrections module 920 with the raw GNSS data.

The vehicle location determination module 940 determines a location of the vehicle based on data from various sources including GNSS data, lidar sensor data, camera sensor data, and the HD map of the geographical region in which the vehicle is determined to be located.

In some embodiments, the HD map system generates a point cloud, for example, based on lidar scans and aligns the lidar-based point clouds with a point cloud representing the HD map of the geographical region surrounding the vehicle. For example, the HD map system determines location of the vehicle by determining a point cloud P1 using the sensor data, for example, lidar scan or camera images. The HD map system loads a point cloud P2 based on the HD map of the geographical region surrounding the vehicle and aligns the point cloud based on the sensor data with the point cloud based on the HD map to determine the location of the vehicle.

The point cloud corresponding to the HD map is determined by the HD map system by aggregating data collected by several vehicles that pass through the geographical region and capture sensor data. The HD map system aggregates sensor data by building point clouds from sensor data collected by multiple vehicle or sensor data captured by the same vehicle at different points in time during separate trips through the region or sensor data captured from different locations during the same trip. The alignment may be performed using iterative techniques such as iterative closest point technique (ICP). The result of alignment is a transformation that provides a mapping from points of the point cloud P1 and points of the point cloud P2. The transformation is used to determine an accurate location of the autonomous vehicle.

In another embodiment, the autonomous vehicle receives camera images and aligns image features with features modeled in a map. The vehicle location determination module 940 identifies features from the sensor data and match them with corresponding features on the HD map to determine the accurate vehicle location.

In an embodiment, the process of determination of accurate vehicle location is an iterative process that initializes the vehicle positon to a value based on the accurate GNSS location and then iteratively improves the vehicle location value based on HD map data and sensor data. In some embodiments, the vehicle location determination module 940 uses image-based odometry to track features in successive images to estimate distance travelled and uses the estimate of distance travelled from the previous location to determine current location of the vehicle.

In an embodiment, the autonomous vehicle uses IMU-based methods that integrate rotation rates and accelerations to estimate relative distances travelled by the autonomous vehicle since the previous location was determined and determines the current location by combining the previous location with the estimate of the distance travelled.

The GNSS data processing module 290 determines RTK corrections based on accurate location and raw GNSS data. The GNSS data processing module 290 determines the RTK corrections for use in future, for example, during the next iteration of the process after the vehicle has driven for some time interval.

Systems and methods for route generation for an autonomous vehicle using HD map data are described in the U.S. patent application Ser. No. 15/853,614 filed on Dec. 22, 2017, which is hereby incorporated by reference in its entirety. Systems and methods for performing global alignment of data collected from sensors of vehicles for determining poses of vehicles are described in the U.S. patent application Ser. No. 15/857,602 filed on Dec. 28, 2017, which is hereby incorporated by reference in its entirety.

Overall Process

Figure 10:
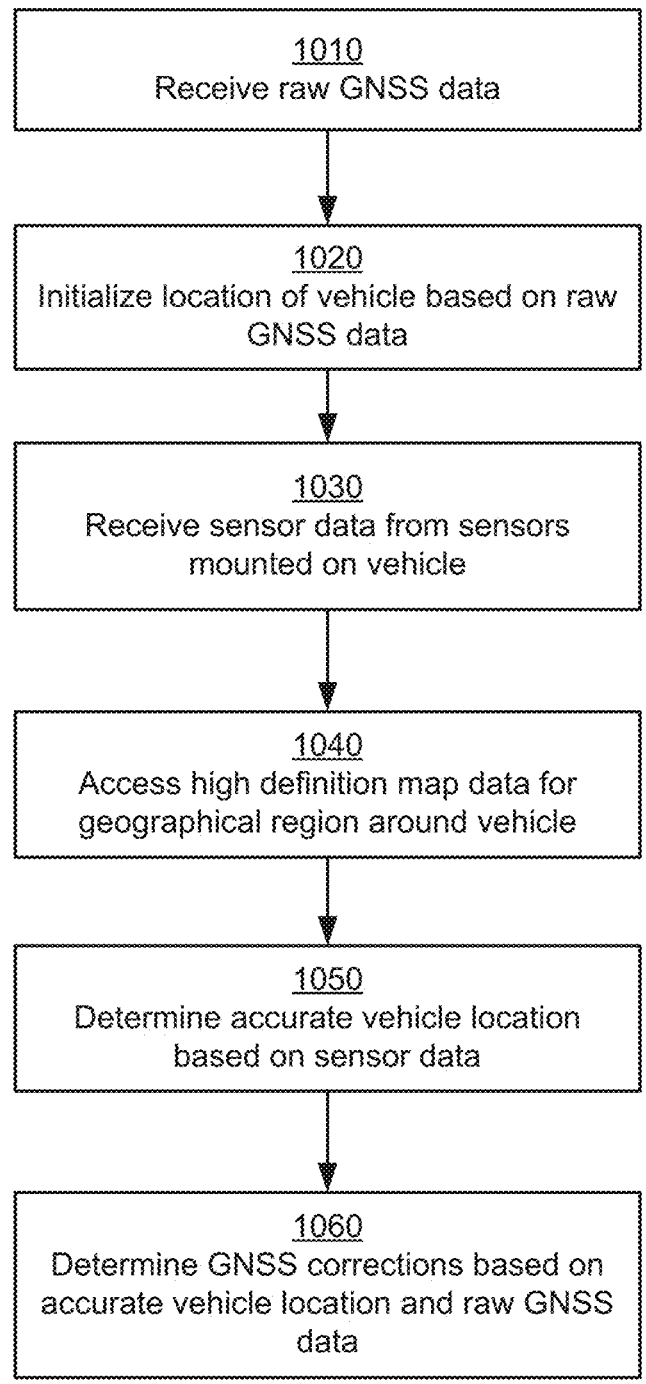
FIG. 10 illustrates the overall initialization process for a vehicle, according to an embodiment.

FIG. 10 illustrates the overall initialization process for a vehicle, according to an embodiment. The steps described may be performed in an order different from that indicated herein. The steps may be performed by modules other than those indicated herein.

The GNSS data processing module 290 receives raw GNSS data from the GNSS receiver 950. The GNSS data processing module 290 initializes 1020 location of vehicle based on raw GNSS data. The GNSS data processing module 290 may initialize using raw GNSS or SBAS enhanced GNSS data, for example, using a GPS system (e.g. U-BLOX, VECTORNAV) that applies SBAS by default, thereby making it available in real time without the overhead of an RTK data link. The initialized location may not be very accurate since it is based on raw GNSS data without any correction. The GNSS data processing module 290 receives 1030 sensor data from sensors mounted on vehicle, for example, lidar scans from lidar or camera images from cameras mounted on the vehicle. The GNSS data processing module 290 accesses 1040 high definition map data for geographical region around vehicle. The GNSS data processing module 290 determines 1050 accurate location of vehicle based on sensor data. Accordingly, the GNSS data processing module 290 determines 1050 the location on the HD map where the vehicle currently exists based on the sensor data and the HD map data. In an embodiment, the GNSS data processing module 290 iteratively improves on the current location initialized to the location based on the raw GNSS data based on the sensor data and the HD map data to determine an accurate location for the vehicle. In an embodiment, the HD map system determines the location of the vehicle by identifying features from the sensor data, for example, traffic signs, building, features on the road such as lane lines etc. The HD map system maps the features identified from the sensor data with the features on the HD map to determine the location of the vehicle. Since the initial location may not be very accurate, the GNSS data processing module 290 may take significant amount of processing to achieve convergence while determining the location of the vehicle on the HD map. The GNSS data processing module 290 determines 1060 initial values for RTK corrections based on accurate location and raw GNSS data. These corrections are similar to RTK corrections determined for a base station, except that instead of a base station in a fixed location, the corrections are with respect to the vehicle location.

Figure 11:
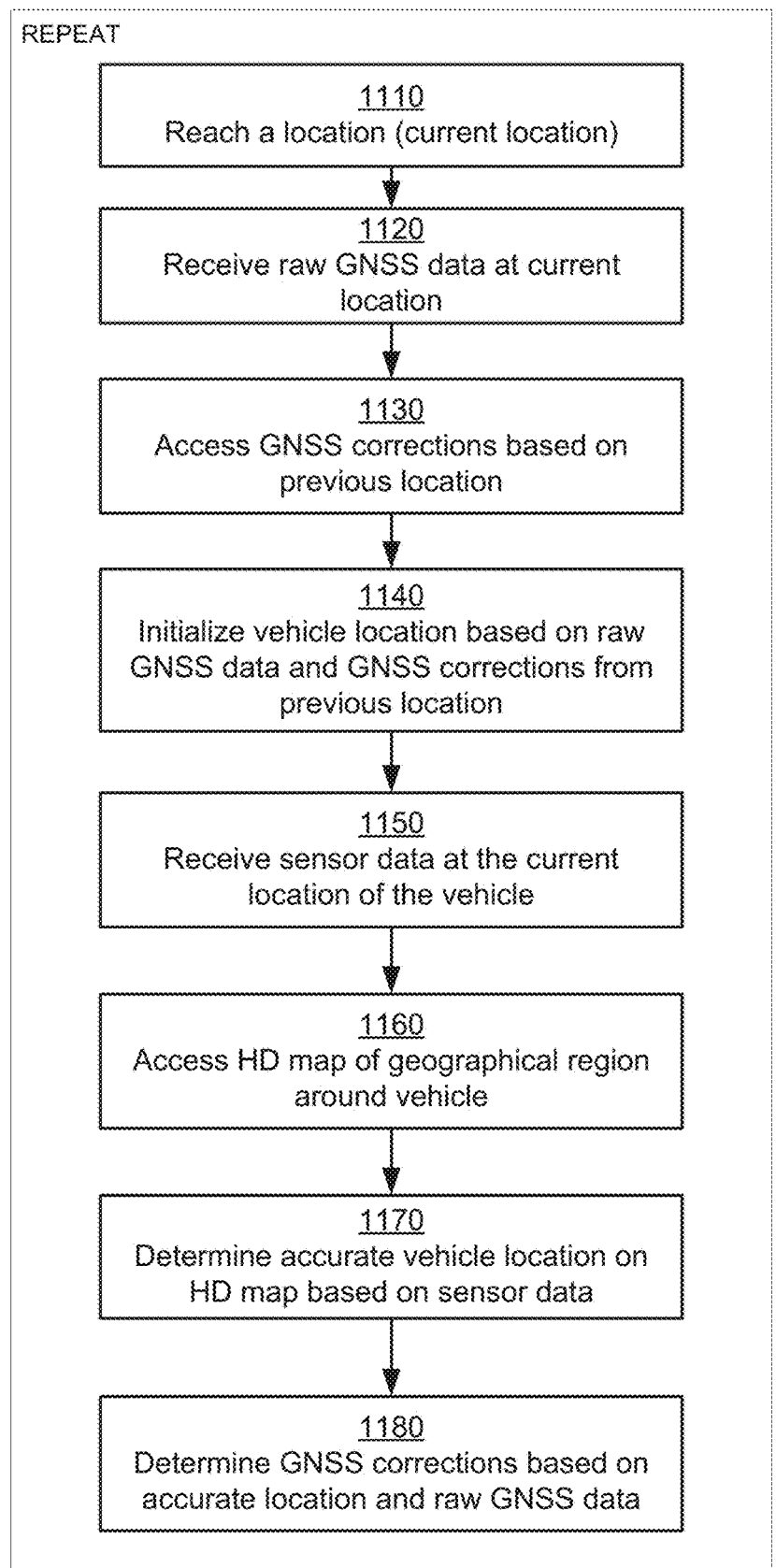
FIG. 11 illustrates the process for determining accurate location of a vehicle based on GNSS position estimates, according to an embodiment.

FIG. 11 illustrates the process for determining accurate location of a vehicle based on GNSS data, according to an embodiment. The steps described may be performed in an order different from that indicated herein. The steps may be performed by modules other than those indicated herein.

The GNSS data processing module 290 repeats the steps of the process as the vehicle drives. The steps may be repeated at an interval of less than a threshold amount of time (for example, less than a second) so that the vehicle is within a threshold distance of a previous location at which accurate location of the vehicle was determined and RTK corrections determines based on the accurate location.

The vehicle reaches 1110 a location that is referred to as the current location, i.e., the location for the current iteration. The GNSS data processing module 290 receives 1120 raw GNSS data at the current location. The GNSS data processing module 290 accesses 1130 previously determined RTK corrections, for example, RTK corrections that were determined at the previous location, i.e., the location of the previous iteration or RTK corrections determined at a previous time.

The GNSS data processing module 290 initializes 1140 vehicle location based on raw GNSS data and RTK corrections from previous location. Accordingly, the GNSS data processing module 290 determines an accurate GNSS position estimate by applying the RTK corrections to the raw GNSS data. The GNSS data processing module 290 initializes the location for the current iteration to the vehicle location based on the accurate GNSS position estimate.

The GNSS data processing module 290 receives 1150 sensor data at the current location of the vehicle. For example, the GNSS data processing module 290 receives 1150 lidar scans from lidar mounted on the vehicle and camera images or videos from camera mounted on the vehicle.

The GNSS data processing module 290 accesses 1160 HD map of geographical region around vehicle. The HD map data may have been previously cached into a random access memory (RAM) of a processor of the vehicle and the GNSS data processing module 290 may access the data loaded in memory. Alternatively, the relevant portion of the HD map may not be available in the main memory and the GNSS data processing module 290 loads the data from a secondary storage such as a disk or downloads data from an online HD map system 110. Systems and methods for storage management of HD map data in an autonomous vehicle are described in the U.S. patent application Ser. No. 15/857,558 filed on Dec. 28, 2017, which is hereby incorporated by reference in its entirety.

The GNSS data processing module 290 determines 1170 accurate vehicle location on HD map based on sensor data. The GNSS data processing module 290 repeats the above steps 1110, 1120, 1130, 1140, 1150, 1160, 1170, and 1180 as the vehicle continues to drive by using the RTK corrections at each location for correcting the raw GNSS data for the next location reached after a time interval.

Figure 12:
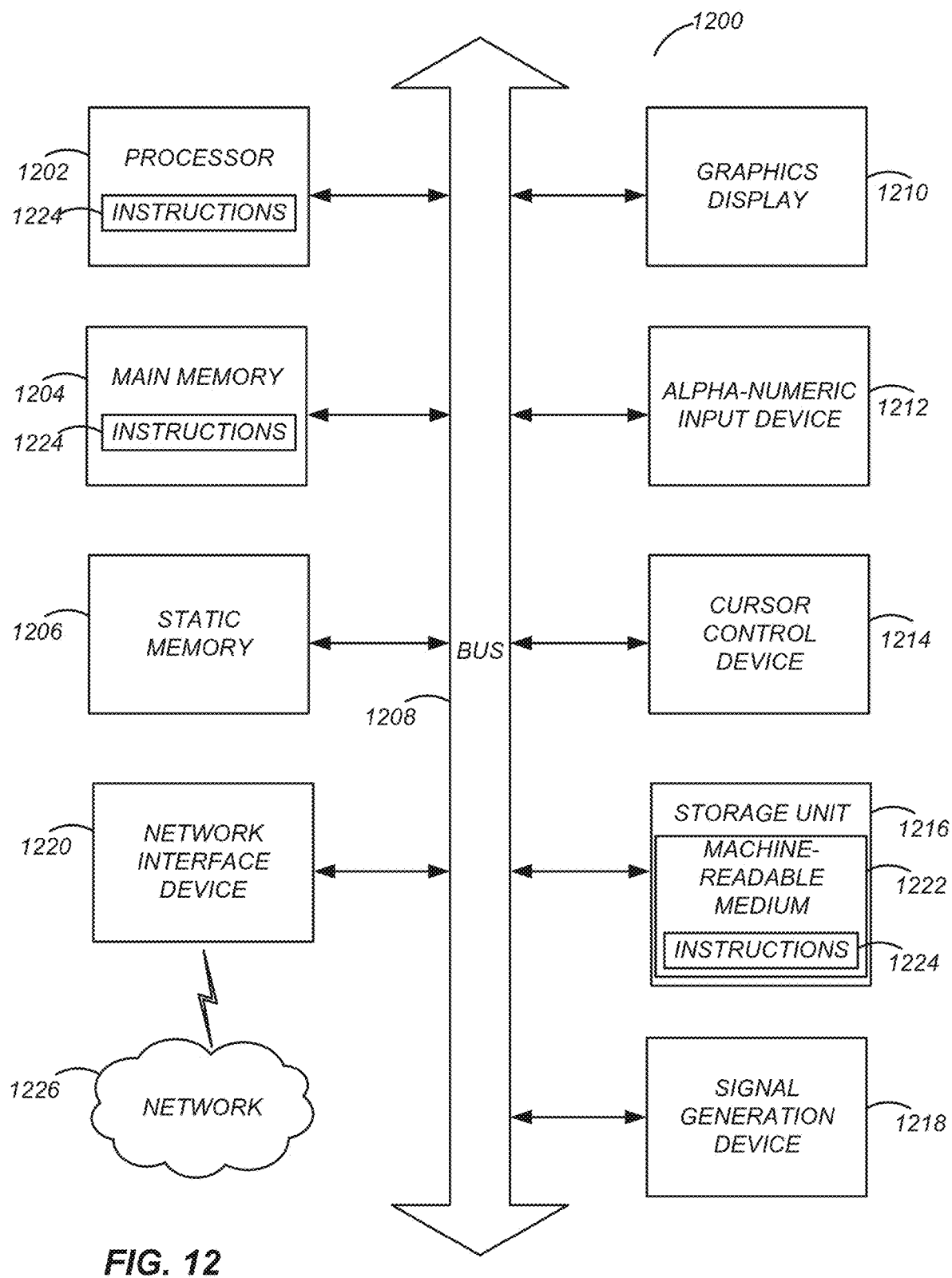
FIG. 12 illustrates an embodiment of a computing machine that can read instructions from a machine-readable medium and execute the instructions in a processor or controller.

The autonomous vehicle may determine control signals for navigating the autonomous vehicle using the current location of the autonomous vehicle and the data of the HD map. The autonomous vehicle navigates the autonomous vehicle based on the control signals Computing Machine Architecture FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Alternative Embodiments

Embodiments of the invention use localization of autonomous vehicles to achieve GNSS accuracy comparable to existing methods that use real-time kinetic (RTK) combined with GNSS, without the corresponding hardware complications and limitations on the coverage of the signal associated with RTK based techniques. Autonomous vehicles perform localization to a map multiple times per second. Use of accurate location estimates for initializing the location allows faster convergence of localization process and reduces the possibility of the localization process getting stuck in a local minima. Furthermore, in under-constrained scenarios, for example, highways that may have good left to right constraints, but sparse forward-backward constraints, embodiments use accurate GNSS position estimates as a good initial guess, thereby providing better localization results and faster convergence. In some embodiments, if the localization process fails, the autonomous vehicle uses accurate GNSS position estimates as default value of the location of the vehicle.

Furthermore, embodiments are able to achieve RTK level accuracy from GNSS with a single receiver/antenna in contrast to RTK based techniques that use two or more receivers/antennas.

RTK solutions have error that grows with the distance from the base station, whereas embodiments achieve RTK-level accuracy independent of the distance from any base station. Embodiments achieve RTK-level accuracy at any location that has adequate GPS signal and HD map data. Existing RTK solutions are dependent on coverage of reference stations networks. Such coverage is limiting, for example, current reference stations cover only a small fraction of the US. In contrast, embodiments are able to achieve RTK-level accuracy at any location. Furthermore, RTK solutions use GPS observations spanning days to get the location of the reference point. In contrast, embodiments of the invention do not require any such overhead to determine location of any reference point.

Although embodiments are described in terms of a moving vehicle being its own reference, other embodiments can use a stationary (or moving) vehicle as the reference point equivalent of an RTK base station for any GNSS application (e.g. surveying) near a mapped road. Some embodiments store the raw GNSS data and other sensor data and execute the methods disclosed herein by post processing after the data is captured. Some embodiments use output of disclosed processes as an input to other processes for further refinement by combining with other sensors (e.g. IMU, visual odometry, radar) using methods like Kalman Filters.

Some embodiments determine a relative location of a vehicle V1 with respect to another vehicle V2 by determining the RTK corrections in one of the vehicles, say V1 and transmitting the RTK corrections from vehicle V1 to vehicle V2. This allows both vehicles to determine their location using the same RTK corrections, thereby increasing the accuracy of the relative location of the two vehicles compared to an embodiment in which each vehicle determines the RTK corrections independently.

In some embodiments, a plurality of vehicles, for example, including the vehicles V1 and V2 and other vehicles that are driving in each other's vicinity exchange their point clouds collected by the sensors of each vehicle. The vehicles further determine their relative locations based on the RTK corrections from one or the plurality of vehicles, for example, V1. Since the relative locations are known with high accuracy, the relative locations between the vehicles are used as a constraint while combining the point clouds of the plurality of vehicles. This provides an aggregate point cloud with high accuracy. The aggregate point cloud is aligned with the HD map to determine location of each vehicle. The individual point clouds of each vehicle may be sparse. The aggregate point cloud has more points and higher quality data. Aligning the aggregate point cloud with the HD map based point cloud gives better accuracy of location of the vehicles.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method comprising:
   determining, using one or more processors, one or more global navigation satellite system (GNSS) corrections corresponding to a GNSS of a vehicle, the GNSS corrections corresponding to one or more ranges between one or more GNSS satellites and the GNSS of the vehicle and being determined based at least on:
     GNSS signal data included in first GNSS data captured using the GNSS, and
     a location corresponding to the vehicle and determined based at least on sensor data generated using one or more sensors of the vehicle and map data;
   obtaining second GNSS data captured using the GNSS;
   updating, using the one or more processors and based at least on the one or more GNSS corrections, the second GNSS data to generate third GNSS data; and
   determining a GNSS location estimate based at least on the third GNSS data.

2. The method of claim 1, further comprising updating the one or more GNSS corrections based at least on the second GNSS data and a second location corresponding to the vehicle as determined based at least on the map data and second sensor data generated using the one or more sensors.

3. The method of claim 1, wherein the one or more GNSS corrections include one or more real-time kinematic (RTK) corrections.

4. The method of claim 1, wherein:
   the sensor data corresponds to a first point cloud;
   the map data corresponds to a second point cloud; and
   the location corresponding to the vehicle is determined based at least on an alignment of the first point cloud with the second point cloud.

5. The method of claim 1, wherein:
   the sensor data corresponds to a first image;
   the map data corresponds to a second image; and
   the location corresponding to the vehicle is determined based at least on an alignment of the first image with the second image.

6. The method of claim 1, further comprising causing the one or more GNSS corrections to be communicated to a device, the device performing localization based at least on the one or more GNSS corrections.

7. The method of claim 6, wherein the one or more GNSS corrections are caused to be communicated to the device based at least on the device being within a threshold distance of the location.

8. The method of claim 7, wherein the device corresponds to a second vehicle.

9. The method of claim 1, further comprising:
   determining a second-location corresponding to the vehicle based at least on second sensor data generated using the one or more sensors and based at least on third sensor data generated using one or more second sensors of a second vehicle, wherein the second sensor data and the third sensor data are aggregated and aligned based at least on a relative location of the vehicle with respect to the second vehicle, and wherein the relative location is determined based at least on the one or more GNSS corrections.

10. The method of claim 1, wherein the determining of the one or more GNSS corrections is based at least on a range determination between the GNSS of the vehicle and a particular GNSS satellite of the one or more GNSS satellites.

11. A processor comprising:
   processing circuitry to perform operations comprising:
     determining one or more global navigation satellite system (GNSS) corrections corresponding to a GNSS of a vehicle, the GNSS corrections being determined based at least on:
       GNSS signal data included in first GNSS data captured using the GNSS, and
       a location corresponding to the vehicle and determined based at least on sensor data generated using one or more sensors of the vehicle and map data;
     obtaining second GNSS data captured using the GNSS;
     applying the one or more GNSS corrections to the second GNSS data to generate revised second GNSS data; and
     determining a GNSS location estimate based at least on the revised second GNSS data.

12. The processor of claim 11, wherein the operations further comprise updating the one or more GNSS corrections based at least on the second GNSS data and a second location corresponding to the vehicle as determined based at least on the map data and second sensor data generated using the one or more sensors.

13. The processor of claim 11, wherein the operations further comprise causing the one or more GNSS corrections to be communicated to a device, the device performing localization based at least on the one or more GNSS corrections.

14. The processor of claim 13, wherein the device corresponds to a second vehicle.

15. The processor of claim 11, wherein the operations further comprise:
   determining a second localization of the vehicle based at least on second sensor data generated using the one or more sensors and based at least on third sensor data generated using one or more second sensors of a second vehicle, wherein the second sensor data and the third sensor data are aggregated and aligned based at least on a relative location of the vehicle with respect to the second vehicle, and wherein the relative location is determined based at least on the one or more GNSS corrections.

16. A system comprising:
   one or more processors to perform operations comprising:
      determining one or more global navigation satellite system (GNSS) corrections corresponding to a GNSS of a vehicle, the GNSS corrections corresponding to one or more ranges between one or more GNSS satellites and the GNSS of the vehicle and being determined based at least on:
         first GNSS data captured using the GNSS, and
         a location corresponding to the vehicle and determined based at least on sensor data generated using one or more sensors of the vehicle and map data;
      obtaining second GNSS data captured using the GNSS;
      updating, based at least on the one or more GNSS corrections, the second GNSS data to generate third GNSS data; and
      determining a GNSS location estimate based at least on the third GNSS data.

17. The system of claim 16, wherein the operations further comprise updating the one or more GNSS corrections based at least on the second GNSS data and a second location corresponding to the vehicle as determined based at least on the map data and second sensor data generated using the one or more sensors.

18. The system of claim 16, wherein the operations further comprise causing the one or more GNSS corrections to be communicated to a device, the device performing localization based at least on the one or more GNSS corrections.

19. The system of claim 18, wherein the device corresponds to a second vehicle.

20. The system of claim 16, wherein the operations further comprise:
   determining a second location corresponding to the vehicle based at least on second sensor data generated using the one or more sensors and based at least on third sensor data generated using one or more second sensors of a second vehicle, wherein the second sensor data and the third sensor data are aggregated and aligned based at least on a relative location of the vehicle with respect to the second vehicle, and wherein the relative location is determined based at least on the one or more GNSS corrections.

* * * * *